UNITED STATES PATENT OFFICE.

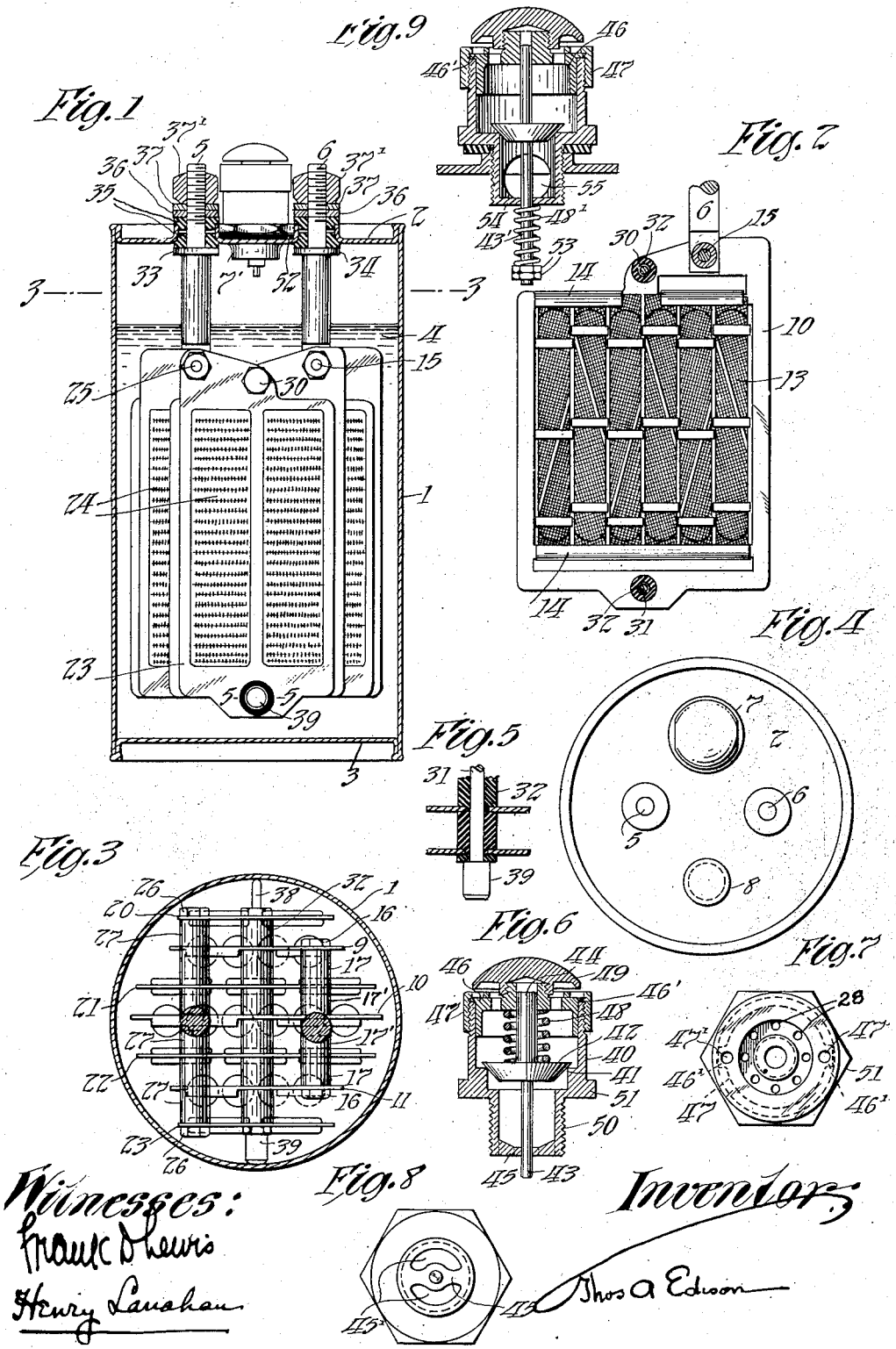

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,073,107.   Specification of Letters Patent.   Patented Sept. 16, 1913.

Application filed January 11, 1912. Serial No. 670,553.

*To all whom it may concern:*

Be it known that I, THOMAS A. EDISON, a citizen of the United States, and a resident of Llewellyn Park, West Orange, Essex county, New Jersey, have invented certain new and useful Improvements in Storage Batteries, of which the following is a specification.

My invention relates generally to storage batteries, and more particularly to storage batteries of the Edison type in which an alkaline electrolyte is employed and in which the positive elements contain flake nickel and nickel hydroxid and the negative elements contain electrolytically active finely divided iron or oxid of iron.

One of the objects of my invention is the provision of a small storage battery suitable for use wherever a battery of only a small capacity and discharge rate is needed, and particularly adapted for use where a portable battery is required, as for example, in portable combined electric lamps and storage batteries.

Another object of my invention is the provision of a gas valve or vent particularly adapted for small batteries of this class, but capable of use in connection with batteries of other types and of other sizes.

In the drawings which accompany and form a part of this specification, and in which like reference characters are employed to designate like parts throughout the several views—Figure 1 is an elevation partly in section of a storage battery cell embodying my invention; Fig. 2 is a side elevation of the central positive plate; Fig. 3 is a section on the line 3—3 of Fig. 1; Fig. 4 is a top plan view of the cell; Fig. 5 is a detail of construction in section on the line 5—5 of Fig. 1; Fig. 6 is a vertical section through the valve or vent, some of the parts being shown in elevation; Fig. 7 is a top plan view of the valve or vent with the cap removed;
Fig. 8 is a bottom plan view of the valve or vent; and Fig. 9 is a vertical section through a portion of the battery top and a modified form of valve or vent, some of the parts being shown in elevation.

Referring to the drawings, a container is shown at 1, which is preferably made of nickel-plated steel and is cylindrical in form and provided with a top 2 and a bottom 3, the top 2 and bottom 3 being welded in place. The container 1 is partly filled with the electrolyte 4, which consists preferably of a solution of potassium hydroxid in distilled water with a small percentage of lithia. The top 2 of the container is provided with openings for the terminals 5 and 6 and for the valve or vent 7. At 8 is shown the filling opening and the closure therefor. The battery plates are assembled so as to form a unitary structure. This structure includes positive plates 9, 10 and 11, and negative plates 20, 21, 22 and 23. The positive plates consist of steel nickel-plated frames or grids containing nickel-plated steel tubes 13. The tubes are filled with alternate layers of nickel hydroxid and pure metallic nickel in thin flakes. The tubes 13 are secured in place in the grids by bent-over portions 14 of the grids, as shown in Fig. 2. The positive plates 9, 10 and 11 are mechanically and electrically secured together by means of a rod 15 passing transversely through them near their upper ends. Metal sleeves 17 and 17' are threaded on the rod 15 and serve to space apart the positive plates 9, 10 and 11. The rod 15 is screw threaded at each end and is provided with nuts 16 for the ends to secure the plates and sleeves in place.

The negative plates 20, 21, 22 and 23 consist of nickel-plated steel frames or grids having openings in which are contained pockets 24 of finely perforated nickel-plated steel. These pockets have compressed therein electrolytically active finely divided iron or iron oxid, as is described in my prior patents. The negative plates 20, 21, 22 and 23 are mechanically and electrically secured together by a rod 25 passing transversely through the same near their upper ends. Metal sleeves 27 are threaded on the rod for spacing apart the negative plates 20, 21, 22 and 23. The rod is screw threaded at each end. Nuts 26, 26 are provided for securing the plates and sleeves in place. All of the plates are mechanically secured together by rods 30 and 31 passing transversely through the same near their tops and bottoms respectively. The rods 30 and 31 are provided with insulating sleeves 32 surrounding the rods and having shoulders extending into the openings in the grids so as to insulate the same from the rods, as is clearly shown in Fig. 5. In this manner, all of the plates are mechanically but not electrically connected by the rods 30 and 31. Suitable means are provided at the ends of the rods 30 and 31 for securing the plates and sleeves in place, such as a head at one end and a nut at the other. The terminal 6 is secured to the rod 15 in any suitable manner, as for example, by providing the lower end of the terminal 6 with an opening through which the rod 15 passes. The terminal 6 is then clamped between two portions 17' of the sleeve 17. The terminal 5 is connected in a similar manner to the rod 25. The terminals 5 and 6 are provided with shoulders 33 and 34 respectively and with reduced screw threaded portions above these shoulders. The terminals 5 and 6 are provided with insulating washers 35 for insulating the terminals from the cover 2 of the metallic container after the plate structure has been drawn in place. The terminals 5 and 6 are provided with nuts 36 for securing them to the cover 2 in such a way that the entire plate structure is suspended from the cover. Lock nuts 37 are provided for the nuts 36. Additional nuts 37' are provided to facilitate the attachment of the terminals to conducting wires. The rod 31 is provided with extensions 38 and 39, the ends of which are in contact with the interior walls of the containing vessel, or nearly so, and serve to position the plate structure in the container and to prevent electrical connection between the plates and the container.

The gas vent includes a plug 40 having an opening extending vertically therethrough and having an edge 41 in the interior of the opening constituting a valve seat for the valve 42. The valve 42 makes line contact only with the seat. The valve 42 is provided with a stem having a lower portion 43 extending through a guiding member 45 fixed across the lower part of the opening in the plug 40, and an upper portion 44 extending through a perforation in the perforated cover 46, which extends across the upper part of the opening through the plug 40. The bottom of the plug 40 is provided with openings 45' to permit the gases to pass from the cell into the interior of the plug. The cover 46 is prevented from being displaced upwardly by means of the flanged retaining member 47 which is threaded upon the exterior of the upper part of the plug 40, and is limited in movement downward by the stops or keys 46' adapted to abut against the top of the plug 40 and to be received in recesses therein. A spring 48 is provided in order to press the valve 40 normally into contact with the seat 41. The spring 48 is coiled around the upper portion 44 of the valve stem and the cover 46 serves as an abutment for the spring. A cap 49 is located above the cover 46 and is screw threaded thereto. The pressure of the spring 48 on the valve 42 may be adjusted by means of the flanged retaining member 47 and openings 47' are provided to permit this adjustment to be made by means of a spanner wrench. The spring 48 is proportioned and adjusted so as to press the valve 42 upon its seat sufficiently firmly to prevent the escape of electrolyte from the container in whatever position the cell may be placed, as for example, when lying on its side or inverted, but permitting the escape of the gases evolved in the operation of the battery when the pressure of the same becomes great enough, that is to say, the valve is adjusted to operate only when the pressure within the container is greater than a pressure corresponding to the head of electrolyte in the cell. As a matter of practice, I have found that with a battery having an electrolyte height of from three to three and one-half inches, it is advantageous to adjust the spring so that the valve will operate when the pressure within the container reaches from two and one-half to three pounds per square inch, but my invention is not limited to these valves.

In the escape of the gases evolved during the operation of the battery, small bubbles of electrolyte are carried by the gases, and in passing through the narrow opening between the valve and its seat, when the valve is operated by the gas pressure, the bubbles are burst and the liquid returned to the electrolyte. The gases escape into the external atmosphere through the perforations 28 in the perforated cover 46. Inasmuch as the valve and its seat have only line contact, the tendency of deposits of potash or other chemicals to form between the valve and its seat is prevented. The cap 49 serves to prevent foreign matter entering the container from the outside. The plug 40 has a reduced portion 50 which is screw threaded and adapted to be screwed into the flanged opening 7' in the top 2 of the container 1. The plug 40 has also a shoulder or flange 51 whose periphery is so shaped as to be adapted to be engaged by a wrench to screw the vent structure into place. A rubber washer 52 may be employed between the shoulder or flange 51 and the top 2 of the container 1 to prevent leakage around the plug. The entire cell is preferably made gas-tight except at the outlet afforded by the valve when the pressure within the cell becomes great enough to operate the valve.

In Fig. 9, a modified form of my improved valve is illustrated, in which the spring is located within the moist atmosphere of the interior of the cell, whereby any tendency to the formation of incrustations of potash or other salts from the electrolyte upon the spring is overcome. In this modification, the lower portion 43′ of the stem is extended downwardly and provided at its lower end with adjustable nuts 53 constituting a head. The spring 48′ is coiled around the lower portion of the stem and is confined between the head 53 and the bottom 54 of the plug. The plug is provided with openings 55 in the lower portion of its wall to permit the gases to pass into its interior from the cell. In other respects the valve or vent illustrated in Fig. 9 is the same as the valve or vent hereinbefore described. The cover 46 is held against downward movement by the stops or keys 46′ which rest in recesses in the top of the plug. The cover 46 is secured in place by the flanged retaining member 47. The tension of the spring is adjusted by means of the nuts 53.

All of the parts of my improved storage battery cell and valve or vent are preferably made of nickel-plated steel, except where it is stated herein that other materials are employed.

Having now described my invention, what I claim and desire to protect by Letters Patent is as follows:—

1. In a storage battery, a cylindrical metallic container and a unitary structure suspended from the container cover comprising positive and negative plates, and means for rigidly connecting together all of said plates, said means comprising conducting means for connecting the positive plates together, conducting means for connecting the negative plates together, and means for connecting all of said plates together, the last mentioned means including a rod extending through all of the plates and insulated therefrom, the length of the rod being approximately equal to the internal diameter of the cylindrical container, and said rod being adapted to keep the plate structure out of contact with the container, substantially as described.

2. In a storage battery, a container, positive plates and negative plates alternately arranged within the container, a pair of vertically disposed terminals having their upper ends extended through the container cover and supported therefrom, a rod extended through the upper portions of said positive plates and through the lower end of one of said terminals to connect the same mechanically and electrically, a rod extended through the upper ends of said negative plates and through the lower end of the other of said terminals to connect the same mechanically and electrically, the lower ends of said terminals being located substantially half way between the ends of said rods, and additional means for connecting mechanically and spacing apart all of said plates, said plates being supported from the container cover by said terminals and rods, substantially as described.

This specification signed and witnessed this 30th day of December, 1911.

THOS. A. EDISON.

Witnesses:
 HENRY LANAHAN,
 ANNA R. KLEHM.